United States Patent [19]
Brickwood

[11] 3,967,670
[45] July 6, 1976

[54] TIRES
[75] Inventor: Alan J. Brickwood, Loughborough, England
[73] Assignee: Molehurst Limited, Leicester, England
[22] Filed: Apr. 3, 1975
[21] Appl. No.: 564,676

[30] Foreign Application Priority Data
Aug. 20, 1974 United Kingdom............. 36491/74

[52] U.S. Cl.............................. 152/337; 152/338; 152/341; 152/342
[51] Int. Cl.² ........................................ B60C 5/06
[58] Field of Search ........... 152/337, 341, 334, 338, 152/340, 341, 342

[56] References Cited
UNITED STATES PATENTS

| | | | |
|---|---|---|---|
| 1,133,938 | 3/1915 | Devereux | 152/337 |
| 1,424,824 | 8/1922 | Johnson et al. | 152/337 |
| 1,881,655 | 10/1932 | Katz | 152/337 |
| 2,155,206 | 4/1939 | Steindel | 152/337 |

Primary Examiner—Drayton E. Hoffman
Attorney, Agent, or Firm—Larson, Taylor and Hinds

[57] ABSTRACT

A tire has a succession of peripherally arranged compartments. The compartments are interconnected by separate passages via one-way check valves for inflating the compartments through one passage and deflating them through another. The passages are both connected to a main valve which enables the passages and thereby the compartments to intercommunicate at least during inflation or deflation but separates the passages and thereby the compartments otherwise.

7 Claims, 17 Drawing Figures

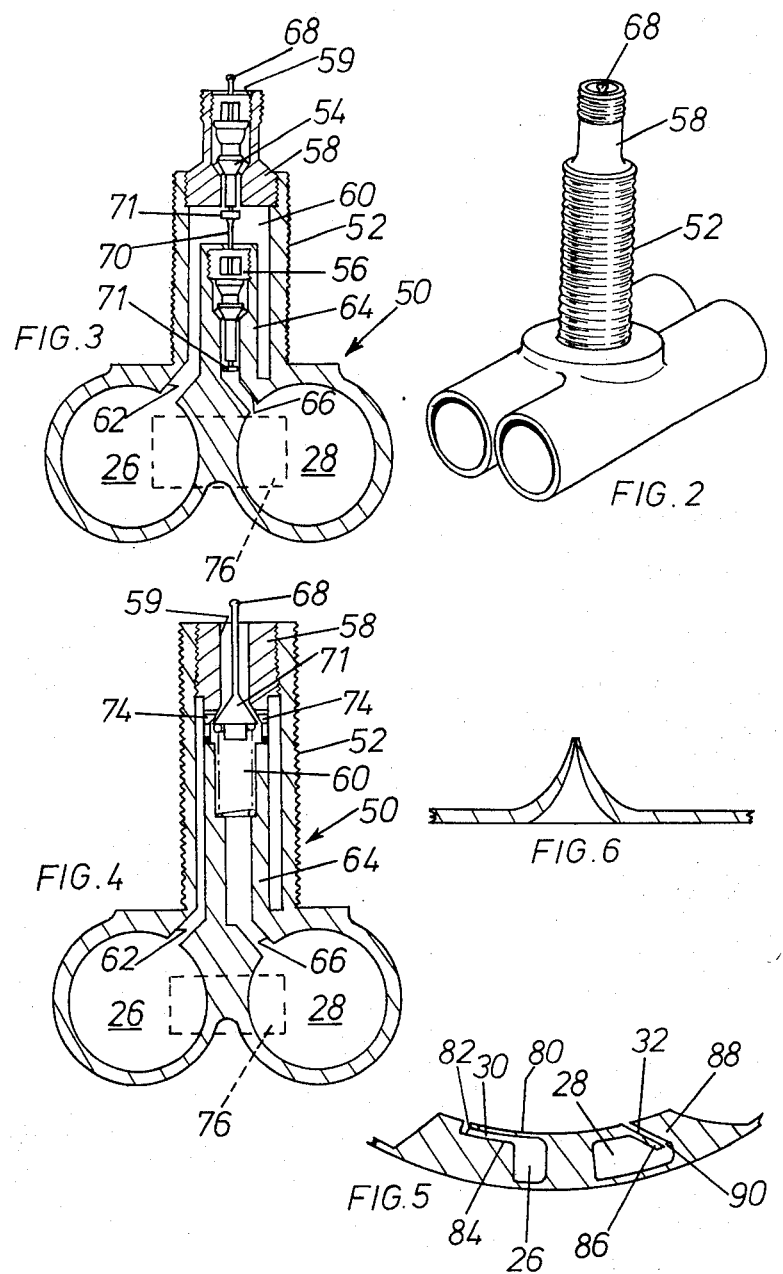

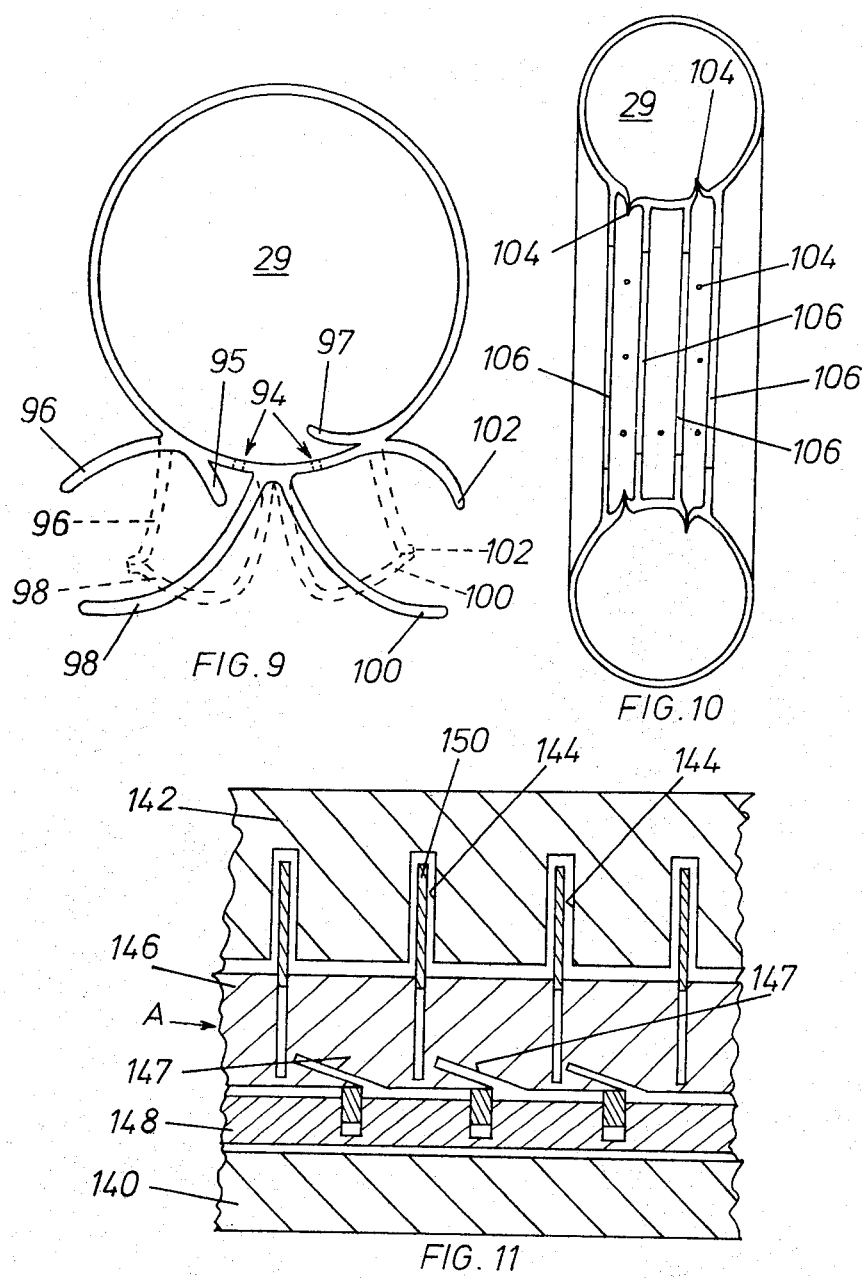

TIRES

The invention relates to multi-compartment tires for use on vehicles.

Multi-compartment tires are described in the British Patent Specification No. 174,376 and U.S. Pat. No. 1,424,824. These tires having a number of compartments arranged along the periphery of the tire all joined to separate inflate or deflate passages via check valves. The inflate and deflate passages have each a separate port for admitting or venting air as the case may be. The inflate and deflate passages are permanently and completely separated except for the interconnection provided via the check-valves and the compartments. In the event of a puncture of one compartment, it was intended that only the punctured compartment and the inflate passage would empty and that the check valves would act to isolate the other compartments, preventing the complete loss of pressure from the tire.

The compartments can be inflated and deflated at the same time, but it is difficult to ensure that the air remains distributed evenly between the compartments. Excess air in one compartment can only move into the deflate passage and not into other compartments except by leakage past the check-valves. If the check-valves permit a satisfactory equalization of air pressure by leakage, they will be correspondingly less reliable in the event of a puncture. Also leakage past the check-valves into the inflate manifold, which becomes depressurised after a puncture may make the whole tire deflate.

The check valves in the British Pat. Specification No. 174,376 and the U.S. Pat. No. 1,424,824 have only a small flow capacity and only one valve opening is provided from each passage to each compartment. Small excesses of air in the compartments can only be expelled flowing relatively fast through the valve opening. This will make the equalization of pressure thoughout the tire difficult.

The main valves described in the British Patent Specification and the U.S. Patent Specification have separate openings for inflating and deflating. It is therefore a complicated operation to bring the tire to a correct pressure.

The check-valves of the U.S. Patent Specification employ balls to close the check-valve ports. During high speed rotation of the tire, the balls will be biassed to move radially outwardly distorting the operation of the check valves. The tire is formed furthermore by a number of separate bags which could detach in the event of a violent puncture.

The British Patent Specification shows a tire made of rubber which has the inflate and deflate passage centrally in the tire. Such a tire is difficult to make in an integral and strong form.

It is therefore an object of the invention to provide a multi-compartment tire which can be inflated and deflated evenly, which remains safe after a puncture has taken place, which can be inflated and deflated with conventional equipment, which is not sensitive to centrifugal forces, which can withstand violent, high speed punctures and/or which can be made economically.

According to the invention there is provided a multi-compartment tire comprising a plurality of compartments arranged in succession around the periphery of the tire, a first annularly extending passage connected via first one-way valve means to each of the compartments for inflating them, a second annularly extending passage connected via second one-way valve means to each of the compartments for deflating them, and a main valve for supplying air to the first passage for inflating the tire and for venting air from the second passage for deflating the tire, in which the main valve has a valve chamber with a first port connected to the first passage, a second port connected to the second passage and a valve member movable into a position for permitting circulation of air between the first and second ports when air is supplied to or vented from the main valve and biassed towards a position separating the first and second ports. The tire may be any form of a tire including an inner tube, or an outer cover in which a tire according to the invention is incorporated. Tires with from 8 to 35 compartments may be provided.

Suitably the walls separating the compartments are formed integrally with the outer walls of the compartments and the valve means and passages are formed integrally with the compartments. The strength of the tire is greatly increased and the tire is unlikely to be damaged in the event of a violent puncture. An integrally formed tire may also stretch to occupy the space of the punctured compartment. Advantageously the first and second passages are arranged on the inner periphery of the tire for location in a well of the tire support. The tires of the invention may be mounted on a wheel support in the same way as single compartment inner tubes. Conveniently the first and second valve means are trumpet valves or flap valves. Trumpet valves have tapered built-up portions defining a valve passage. The built-up portions and valve passage may extend peripherally along the tire or may be in the form of cones. Advantageously the flap valves include slits extending substantially along the length of the compartment for conducting air between the compartments and the passages.

Separation of the first and second ports can be effected by adapting the valve member to block flow of air through a further main air inlet and outlet port of the main valve in the inactive position or by having a separate valve member for blocking flow of air through the further main air inlet and outlet port. The main valve may be adapted to communicate with the first and second passage on opposite sides of the valve in which case the first passage will form a complete loop around the tire and the second passage will form a second complete loop interconnected only through the chamber. Alternatively the main valve may be connected to the passages, the first and second passages forming a single loop connected through the chamber and to each other.

Separation of the first and second ports may involve the substantial elimination of air flow between them. The ports may be separated however also in such a way that a certain amount of air flow is possible. Preferably a pressure-sensitive valve is provided for interconnecting the passages, which valve is connected to the first and second ports and biassed to permit flow of air between the passages but adapted to close when the pressure in the first passage drops a predetermined level below that in the second passage. Such a pressure sensitive valve may be of any convenient design and may be mounted in the valve member separating the first and second ports or in the main valve in a separate passage connecting the first and second passages or even spaced from the main valve between the first and second passages.

When a compartment of a tire receives too much air on inflating compared with other compartments, the excess of air can be expelled from it at any time until inflation of all compartments is completed. The excess air is expelled into the second passage and pressures can be equalized or evened out throughout the tire through a communication of the second passage with the chamber in the main valve and hence the first passage. Similar effects occur on deflating the tire or measuring the tire pressure. Thus the pressures and volumes of air in each compartment can be evened out without relying on leakage of air in a reverse direction past the one-way valve means. Thus the one-way valve means can be constructed to respond promptly to any loss of pressure in one compartment. When a compartment is punctured, it will deflate but the first passage will deflate also so closing all the one-way valve means associated with that passage and reducing loss of air from other compartments.

One way valve means using flaps and slits are both capable of permitting rapid inflation of the compartments through the slits as well as responding quickly to losses of pressure resulting from a puncture. The large flows of air possible through the slits facilitate evening out of the volumes and pressures of air in each compartment.

The use of pressure-sensitive valves permits the levelling process to continue even after the main valve is no longer in use for inflation or deflation. Thus flow of air between the first and second passages remains possible until, on puncturing a compartment, the pressure in the first passage drops excessively and the pressure sensitive valve closes.

Various methods for making the tires of the invention are described generally in the claims which follow later and more specifically in the description with reference to the drawings. The tires can be constructed integrally with attendant advantages of manufacturing cost and strength. Extrusion of green rubber followed by curing particularly represents an advantageous method for mass-production.

The invention is particularly described with reference to the drawings in which:

FIG. 2 is a perspective view of a main valve for the tire of FIG. 1;

FIG. 3 is a section through a main valve for the tire of FIG. 2;

FIG. 4 is a section through another form of main valve for the tire of FIG. 2;

FIG. 5 is a section through one way-valves for the tire of FIG. 1;

FIG. 6 is a section through another form of one-way valve for a tire according to the invention;

FIG. 9 is a section through another form of extrusion for making a tire according to the invention;

FIG. 10 shows a section through a rotationally moulded tire according to the invention;

FIG. 11 shows a section through an injection mould for making a tire according to the invention;

TIRE

Figure 1:
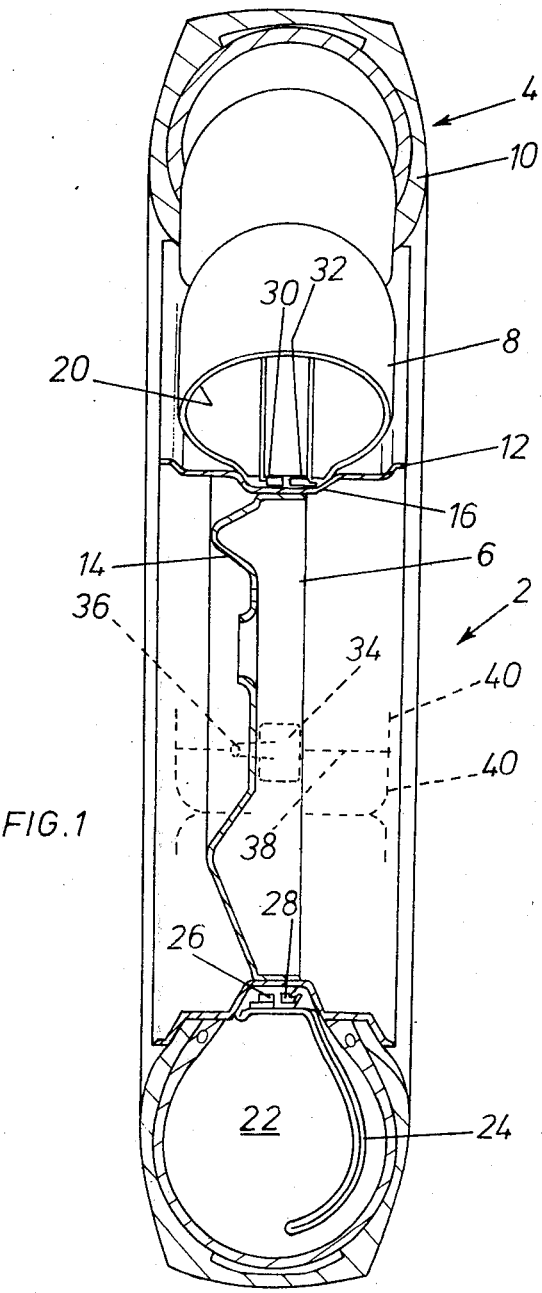
FIG. 1 is a wheel having a tire according to the invention having a section of the wheel cut away and part of the tire outer cover removed.

With reference to FIG. 1, a wheel 2 consists of a tire 4 and a tire support 6. The tire 4 is in the form of an inner tube 8 covered by an outer cover 10 with the tire tread. The tire support 6 has a rim 12 surrounding a hub 14 for mounting on a stub shaft of a vehicle (not shown). The rim 12 has an annular recessed portion or well 16.

The rubber inner tube 8 has a succession of peripherally mounted compartments 20. Successive compartments 20 are defined by transversely extending wall parts 22 crimped together along a joint 24. An annularly extending manifold 26 is formed by the inner tube 8 and is located in the well 16 and a similar manifold 28 is arranged parallel next to the manifold 28. The manifolds 26, 28 are each connected by one-way flap valves 30, 32 to each of the compartments 20. A main valve 34 has a tube 36 extending through the rim 12 to a position inside the rim 12. The main valve 34 is connected to the manifolds 26 and 28 on both sides of the valve 34 and is located at a joint 38 between longitudinally extending wall parts 40 of the inner tube 8.

The main valve 34 can be made in a variety of constructions. Two constructions are set-out by way of example. With reference to FIGS. 2 and 3 a valve body 50 has a pair of peripherally extending passages for connecting to the manifolds 26, 28. The body 50 also has a generally radially extending part 52 in which are located two valve cores 54, 56, one on top of the other. One valve core, 54, is retained in a plug 58 on top of the part 52 and controls the movement of air through a port 59 between the outside of the valve 34 and a valve chamber 60 underneath the plug 58. The valve chamber 60 is in permanent communication with a port 62 leading to the manifold 26. The other valve core 56, is retained in an inner member 64 and controls movement of air between the chamber 60 and a port 66 leading to the manifold 28. The valve cores 54, 56 have stems 68, 70 to which are attached valve members 71 and which can be pressed to permit flow of air through the valve cores 54, 56 past the valve members 71. The stems 68, 70 are arranged in line and in contact so that they are actuated simultaneously. With reference to FIG. 4, the valve body 50 contains a single stem 68 carrying a conically shaped valve member 71. The plug 58 and the inner member 64 form an annular compartment connected to the port 62. The member 71 is mounted in the valve chamber 60 and urged upwards by a spring 72. The valve chamber 60 has firstly a number of apertures 74 leading to the annular compartment which can be blocked by the member 71 and secondly the port 66 at the bottom of the chamber 60 below the member 71.

In FIGS. 3 and 4, an optional pressure sensitive valve is indicated at 76. The valve 76 is adapted to close when the pressure in the manifold 26 drops a predetermined amount below that of the manifold 28. Such pressure sensitive valves may also be located in modified valve members 71 or away from the main valve 34 in the inner tube 8.

With reference to FIG. 5, the one-way valves 30, comprise a flap 80 lying over a shallow recess 82. A slit 84 formed by the flap 80 and the recess leads onto the manifold 26. The one-way valves 32 comprise a flap 86 extending along a longitudinally extending projection 88. The slit 90 between the flap 86 and the projection 88 leads onto the manifold 28. The one-way valves may alternatively be constructed to have holes for conducting air instead of slits. One form is shown in FIG. 6, where a one-way trumpet valve is formed by a tapered, generally conical body of rubber.

OPERATION OF THE TIRE

Compressed air is supplied through the nozzle 59 whilst the stem(s) 68 are pressed in order to inflate the tire 4. The valves 34 in FIGS. 3 and 4 are shown in this position. The air will enter into the chamber 60 and pass through the ports 62 and 66 into the manifolds 26 and 28. The build-up of pressure in the manifold 28 will cause the flap 86 to lie against the projection 88 and close the slit 90. The build-up of pressure in the manifold 26 will open the slit 84 and the compartments 20 will be inflated. If one compartment is inflated too much, excess air can be expelled into the manifold 28, when the pressure in the compartment 20 approaches that in the manifold 28. No build-up of pressure will occur in the manifold 28 because it communicates via the port 66, the chamber 60 and the port 62 with the manifold 26. Whilst inflation proceeds, the pneumatic system is therefore effectively open and pressures can even out throughout the pneumatic circuit including the inflation and deflation parts of the circuit. The same effect occurs when the stem(s) 68 is pressed to make a pressure reading or to deflate the tire 4 through the manifold 28. When the valve stem(s) 68 is released it is biased to block flow through the port 59. The ports 62 and 66 are then no longer in communication through the chamber 60 but are separated by the valve member 71.

When one compartment 20 is punctured, the pressure in it will drop rapidly. Air will also escape from the manifold 26. The pressure inside the remaining compartments 20 will close the valves 30. No or little air will escape from the other compartments 20. If a valve 76 is incorporated, the pressure difference between the manifolds 26 and 28 will cause it to close. Pressure will therefore be preserved in the manifold 28. Only the single compartment therefore collapses, the other compartments 20 may expand through the elasticity of rubber to occupy the space left by the punctured compartment. In the event of a puncture, the pneumatic system is changed automatically to a closed one, isolating the compartments from one another and the manifold 26 from the manifold 28.

The expansion of the other compartments may block the puncture in the outer cover 10. A driver can tell that a puncture has occurred by unbalance of the tire or by measuring the pressure of the tire. On inflating a punctured tire air will slowly leak from the inflation manifold serving as an indication that a puncture has taken place. However provided the puncture is not too serious, the tire can still be inflated through the inflate manifold. A connection can also be provided to measure the pressure in the inflation manifold, for example by a separate valve for measuring the pressure or by enabling the stem 68 to be pressed into one position for connecting the chamber 60 to the port 62 and measuring pressure in the inflation manifold 26 and only on further movement with the port 66 as well as the port 62 to measure the pressure in the deflation manifold 28 and the compartments 20.

MANUFACTURE OF THE TIRE

Figure 8:
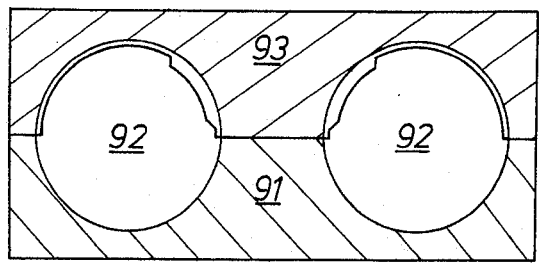
FIG. 8 is a section through a mould for curing the extrusion of FIG. 7.
Figure 7:
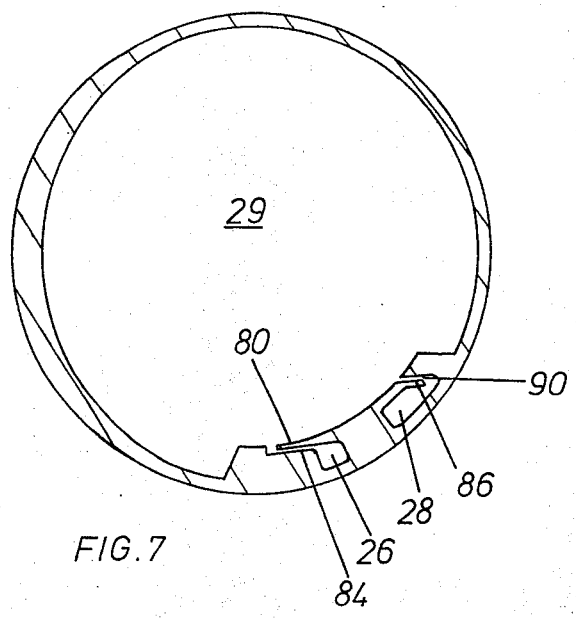
FIG. 7 is a section through an extrusion for making the tire of FIG. 1.

With reference to FIGS. 7 and 8, the tire 4 is manufactured by extruding uncured, green, rubber in the form shown in FIG. 7. The extrudate will be provided with the passages for the manifolds 26, 28 and a continuous main passage 29 and the flaps 80, 86 and slits 84, 90 for the one-way valves 30, 32. The extrudate is then cut to length. Part of the extrudate at each edge, which part contains the manifold passages 26, 28 is removed and a main valve 34 is joined to the passages with the edges of the extrudate overlapping (see FIG. 1). The extrudate is then laid in the bottom half 91 of the mould (as shown in FIG. 8) which has radial webs 92 at a plurality of angularly spaced positions. The part of the extrudate containing the passages 26, 28 is located in corresponding recesses in the webs 92. The top half 93 of the mould is then placed on the bottom half pressing the walls of the extrudate together at the locations of the webs 92 without closing the passages 26, 28. Air is then blown into the extrudate through the main valve 34 which air may contain a release agent to prevent sealing of the flaps. The extrudate will expand, stretching the thicker part of its wall (see FIG. 7). The blown up article is heated to cure it. This will complete the manufacture of the inner tube 8 of FIG. 1.

This method can be modified by extruding the passages for the manifold on the outside of the main passage 29. The shapes of the web 92 may be changed or a web provided with the top half 93 of the mould to change the configuration of the tire where the transversely extending wall parts 22 are joined. For example, the webs 92 could be applied to join the wall without exerting pressure on the manifold passages.

The tires of the invention may also be made from different processes leading to tires differing in appearance, but not operation, from that of FIG. 1. With reference to FIG. 9, an extrudate could be prepared as shown in full lines. Holes could then be made by piercing as shown at 94 and the external flanges 96 and 98, and 100 and 102 could be joined as shown in dotted lines. The manufacture could then be completed as described previously with reference to FIG. 8. Flaps 95 and 97 would serve to prevent flow of air through the holes 94 in one direction.

With reference to FIG. 10, the inner tube 8 may also be made by rotational moulding to give a single compartment inner tube having trumpet valves 104 and flanges 106 on each side of the valves 104. The inner tube may be completed by piercing the trumpet valves 104 and joining the edges of the flanges 106 and forming compartments by crimping as described with reference to FIG. 8.

With reference to FIG. 11, an inner tube may be made from a moulded piece of unvulcanised rubber. A suitable mould comprises outer mould portions 140 and 142 defining a longitudinal cavity. The upper portion 142 has transverse recesses 144. The mould further has three removable elongate male parts, including an upper part 146 for forming a main channel and two lower parts 148 for forming minor, manifold channels. The part 146 has a number of recesses for containing fingers 150 which can be moved outward into the recesses 144, a number of inclined recesses 147 facing one of the parts 148, and a number of short recesses containing pins (not shown) for moving against the other part 148. The part 148 shown in FIG. 11 has a number of retractable pins for bearing against the part 146 underneath the recesses 147. The part 148 behind the part 148 shown has a number of recesses underneath the pins in the part 146 inclined in the same direction as the recesses 147.

The outer mould portion 142 is first placed on top of the mould portion 140. The male parts 146 and 148 are then introduced in the direction of arrow A in FIG. 11 with the various fingers 150 and pins retracted to provide a smooth overall surface. The fingers 150 are then raised into the recesses 144 and the pins are projected. Rubber compound is then introduced into the spaces remaining between the mould portions 140, 142 and the parts 146 and 148. The compound is partially vulcanised. The previous steps are then reversed. Because of the inclination of the recesses 147 the part 146 may be withdrawn.

The resulting moulding has a main channel connected by apertures formed by the pins manifold channels. The inclined recesses have formed flaps above and underneath the apertures acting as one-way valves. The moulding is then finished into an inner tube by vulcanising the ends of the moulding together, attaching an inflation/deflation valve, inverting the rubber portions formed by the recesses 144 and the fingers 150 to position them inside the main channel, and vulcanising the inverted portions to the rubber portions formed between the parts 146 and 148 to form separate compartments.

Figures 12, 13, 14:
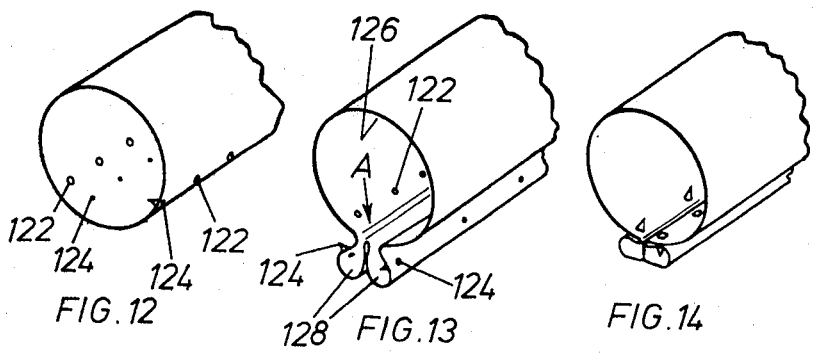
FIGS. 12, 13, 14 shows successive stages generating a tire according to the invention from a tube.

With reference to FIGS. 12, 13 and 4, an inner tube of the invention may be made by rotational moulding or injection moulding, as shown in FIG. 12 where 122 are rows of large apertures and 124 are rows of trumpet valves directed to permit flow of air into or out of the inner tube. The tube is shaped as in FIG. 13 to form an annular portion 126 having a large cross-section, and a pair of annular portions 128 having a small cross-section. The walls of the inner tube are vulcanised together at A to separate these portions. The projecting parts of the trumpet valves 124 are then passed through the holes 122 on one side and brought oppposite the holes 124 at the other side to give the configuration shown in FIG. 14. The contacted parts of the portions 126 and 128 are vulcanised together whilst the portion 126 is crimped transversely to form the different compartments.

Figure 15:
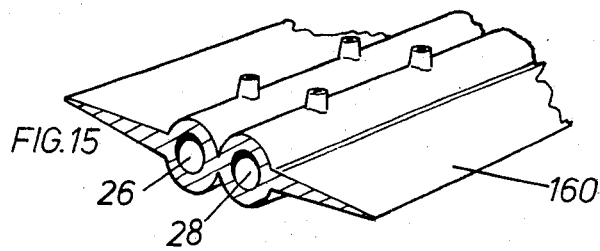
FIG. 15 shows a part for fabricating a tire according to the invention.
Figures 16, 17:
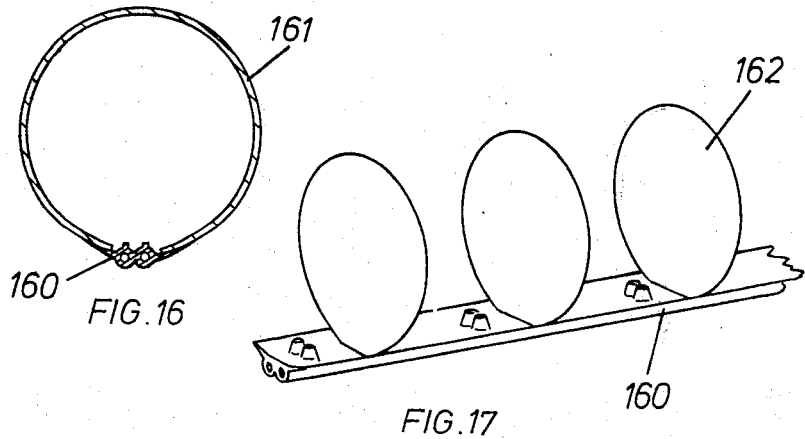
FIG. 16 shows a section through a fabricated tire according to the invention.
FIG. 17 shows a modified part for fabricating a tire according to the invention.

With reference to FIG. 15, the manifold passages 26 and 28 may be formed by injection moulding, extrusion or pressure forming in a separate strip 160 as shown. This can be combined with a length of flat rubber sheet 161 to give a tube having a section as shown in FIG. 16. The tube can be processed as the extrudates described previously to form a tire of the invention. Alternatively the manifold passages may be formed having attached to it transverse wall parts 162. Thus a tire of the invention may be manufactured without having to form the walls by crimping.

I claim:

1. Multi-compartment tire comprising:
    A. a plurality of compartments arranged in succession around the periphery of the tire;
    B. a first annularly extending passage, and first one-way valve means located between the first passage and each of said compartments and adapted to block flow of air from each of said compartments to the first passage;
    C. a second annularly extending passage, and second one-way valve means located between the second passage and each of said compartments and adapted to block flow of air from the second passage to each of said compartments;
    D. a main valve housing connected to the first passage and to the second passage, an external port for supplying air to or venting air from the housing, a valve chamber in the main valve housing continuous with the external port, a first internal port continuous with the valve chamber and connected to the first passage, a second internal port continuous with the valve chamber and connected to the second passage; and
    E. a first valve member located at least in part in the chamber movable into a first position in which the external port is open and the internal ports are in direct intercommunication and biassed to a second position in which the external port is closed and in which the first valve member separates the internal ports to restrict communication between them.

2. Multi-compartment tire as claimed in claim 1 wherein the first and second one-way valve means include longitudinally extending slits intercommunicating the first and second passages and the compartments and longitudinally extending flaps alongside the slits to block flow of air through the slits from the compartments to the first passage and from the second passage to the compartments.

3. Mulit-compartment tire as claimed in claim 1 wherein pressure sensitive valve means are located between the first and second passages adapted to block flow of air from the second passage to the first when the pressure in the first passage drops a predetermined amount below that in the deflation passage.

4. Multi-compartment tire as claimed in claim 1 wherein the chamber of the main valve housing has a first valve member seating for blocking flow of air through the external port and the one of the internal ports is arranged to pass through the seating.

5. Multi-compartment tire as claimed in claim 1 wherein the chamber of the main valve housing has a first valve member seating for blocking flow of air through one of the internal ports and a further seating between the first valve member and the external port and a further valve member is contained in the chamber for engaging the further seating to block flow of air through the external port.

6. Multi-compartment tire as claimed in claim 1 wherein the plurality of compartments and the first and second passages are integrally constructed.

7. Multi-compartment tire as claimed in claim 1 in which the one-way valve means are trumpet valves.

* * * * *